United States Patent
Jung et al.

(10) Patent No.: US 9,450,483 B2
(45) Date of Patent: Sep. 20, 2016

(54) APPARATUS AND METHOD FOR CONTROLLING INVERTER BY MEASURING EACH PHASE CURRENT

(71) Applicant: LSIS CO., LTD., Anyang-si, Gyeonggi-do (KR)

(72) Inventors: Yuseuk Jung, Seoul (KR); Jae Moon Lee, Suwon-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/550,793

(22) Filed: Nov. 21, 2014

(65) Prior Publication Data

US 2015/0155773 A1    Jun. 4, 2015

(30) Foreign Application Priority Data

Nov. 29, 2013  (KR) .......................... 10-2013-0147051

(51) Int. Cl.
| | |
|---|---|
| *H02M 1/32* | (2007.01) |
| *H02M 7/44* | (2006.01) |
| *H02P 27/08* | (2006.01) |
| *H02P 21/08* | (2016.01) |
| *H02P 21/14* | (2016.01) |
| *H02M 7/5387* | (2007.01) |
| *H02P 31/00* | (2006.01) |

(52) U.S. Cl.
CPC .................. *H02M 1/32* (2013.01); *H02M 7/44* (2013.01); *H02M 7/53871* (2013.01); *H02M 7/53873* (2013.01); *H02P 21/08* (2013.01); *H02P 21/141* (2013.01); *H02P 27/08* (2013.01); *H02P 31/00* (2013.01); *H02P 2207/01* (2013.01)

(58) Field of Classification Search
CPC ....................................................... H02M 1/32
See application file for complete search history.

(56) References Cited

U.S. PATENT DOCUMENTS

| | | | | |
|---|---|---|---|---|
| 4,772,996 A | * | 9/1988 | Hanei ............... | H02M 7/53873 318/811 |
| 5,739,664 A | | 4/1998 | Deng et al. | |
| 7,199,538 B2 | * | 4/2007 | Kameya .............. | B62D 5/046 180/443 |
| 7,483,279 B2 | * | 1/2009 | Lee ..................... | H02P 23/0036 363/41 |
| 7,948,205 B2 | * | 5/2011 | Gunji ................... | H02P 29/021 318/800 |
| 7,990,093 B2 | * | 8/2011 | Kezobo ............... | B62D 5/0484 318/432 |
| 2005/0029982 A1 | | 2/2005 | Stancu et al. | |

(Continued)

FOREIGN PATENT DOCUMENTS

| | | |
|---|---|---|
| EP | 2469692 | 6/2012 |
| JP | 08-181722 | 7/1996 |

(Continued)

OTHER PUBLICATIONS

Korean Intellectual Property Office Application Serial No. 10-2013-0147051, Office Action dated Apr. 13, 2015, 5 pages.

(Continued)

*Primary Examiner* — Emily P Pham
(74) *Attorney, Agent, or Firm* — Lee, Hong, Degerman, Kang & Waimey; Jonathan Kang; Richard Salfelder (57) ABSTRACT

An apparatus and a method for controlling an inverter are disclosed. The apparatus determines a 3-phase current by receiving a 2-phase current from a leg-shunt resistor arranged at an emitter terminal of a lower switching element in an inverter unit of an inverter, and determines whether there is an abnormality generated in the 3-phase current, to correct the abnormality in the current.

14 Claims, 7 Drawing Sheets

(56) References Cited

U.S. PATENT DOCUMENTS

2007/0165431 A1    7/2007   Gunji
2007/0296375 A1   12/2007   Sakaguchi et al.

FOREIGN PATENT DOCUMENTS

| | | |
|---|---|---|
| JP | 2005-001574 | 1/2005 |
| JP | 2005-094995 | 4/2005 |
| JP | 2006-197769 | 7/2006 |
| JP | 2006-230766 | 9/2006 |
| JP | 2007-008294 | 1/2007 |
| JP | 2007-189825 | 7/2007 |
| JP | 4115696 | 7/2008 |
| JP | 2012-236531 | 12/2012 |
| JP | 2013-111467 | 6/2013 |
| KR | 10-2010-0033862 | 3/2010 |

OTHER PUBLICATIONS

European Patent Office Application Serial No. 14194637.6, Search Report dated Aug. 11, 2015, 7 pages.

Japan Patent Office Application Serial No. 2014-241127, Office Action dated Jan. 5, 2016, 7 pages.

\* cited by examiner

APPARATUS AND METHOD FOR CONTROLLING INVERTER BY MEASURING EACH PHASE CURRENT

Pursuant to 35 U.S.C. §119(a), this application claims the benefit of earlier filing date and right of priority to Korean Patent Application No. 10-2013-0147051, filed on Nov. 29, 2013, the contents of which are hereby incorporated by reference herein in its entirety.

BACKGROUND

1. Field of the Disclosure

The present disclosure related to an apparatus and a method for controlling an inverter. More specifically, the present disclosure relates to an apparatus and a method for controlling an inverter to measure each phase current using a leg-shunt resistor.

2. Discussion of the Related Art

In general, an inverter is a device converting direct current (DC) into alternating current (AC) electrically. The inverter controls speed of a motor by receiving electricity from a commercial power supply, and by altering voltage and frequency in the inverter to supply to the motor.

Figure 1:
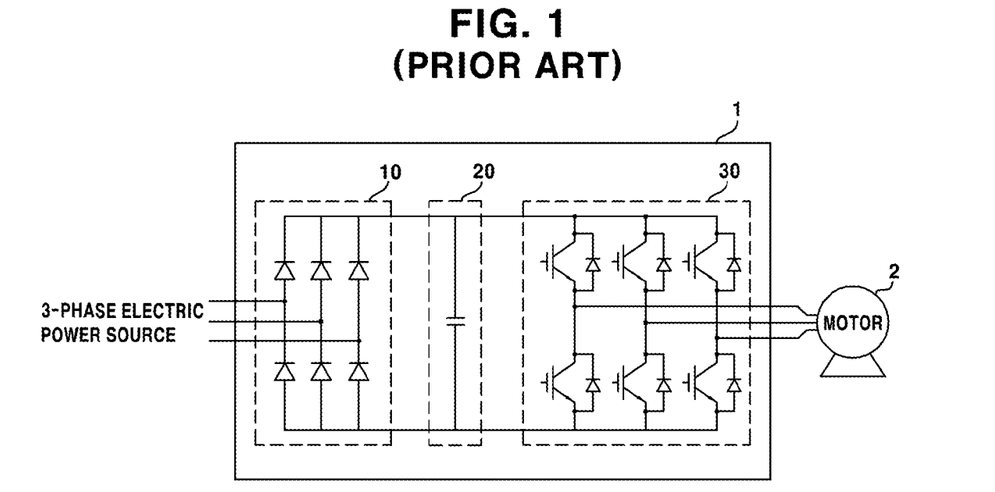
FIG. 1 is a block diagram of a general inverter system.

FIG. 1 is a block diagram of a general inverter system.

As illustrated in the figure, the inverter (1) drives the motor (2) whereby the rectification unit (10) converts a 3-phase electricity inputted to DC electricity, and the DC-link capacitor (20) accumulates the DC electricity, and then the inverter unit (30) converts the accumulated DC electricity to AC electricity again and alters voltage and frequency. Therefore, the inverter is also referred to as a variable voltage variable frequency (VVVF) system.

Recently, a current detection method using shunt resistors is commonly used in small inverters for the purpose of acquiring cost competitiveness. The current detection method using shunt resistor may be categorized into a DC-link shunt resistor current detection method, an output phase shunt resistor current detection method, and a leg-shunt resistor current detection method, according to positions of the shunt resistor.

Figure 2:
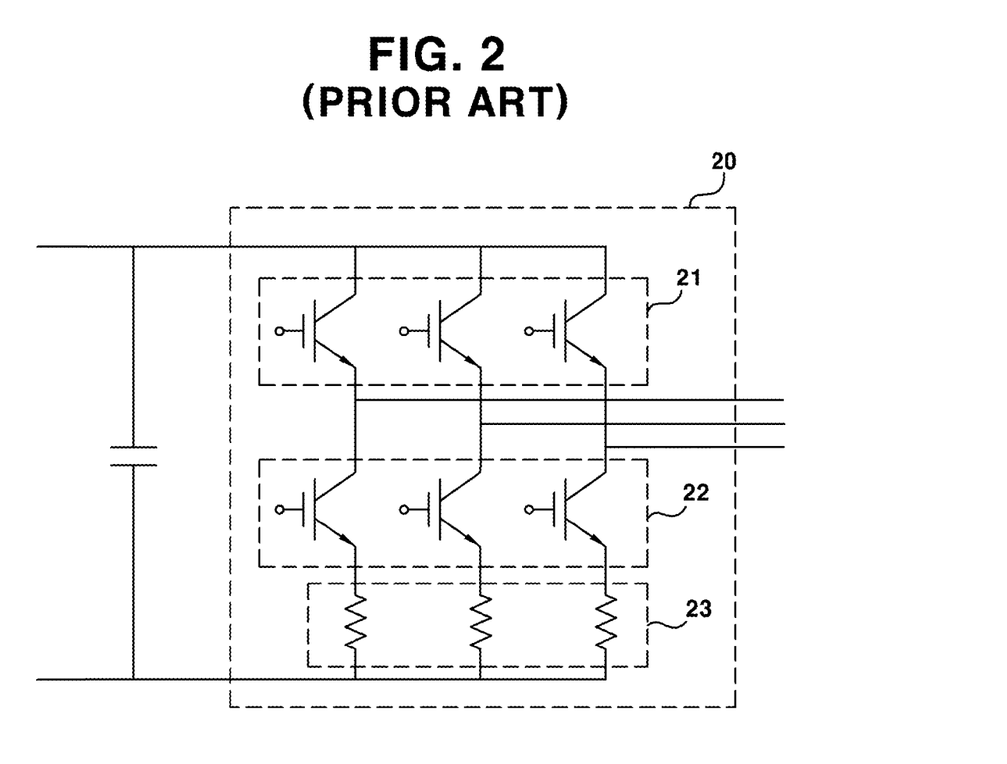
FIG. 2 is a block diagram illustrating a leg-shunt resistor current detection method.

FIG. 2 is a block diagram illustrating a leg-shunt resistor current detection method.

As illustrated in the figure, the leg-shunt resistor current detection method is a method where a shunt resistor is arranged at an emitter terminal of the lower insulated gate bipolar transistor (IGBT) (22) in the inverter unit (30) to detect currents, which has advantages of realizing a circuit at a low cost and detecting an instantaneous current as well.

However, the method using the leg-shunt resistor also has a problem that the current detection area is restricted by pulse width modulation (PWM) switching status of the IGBT.

Figure 3:
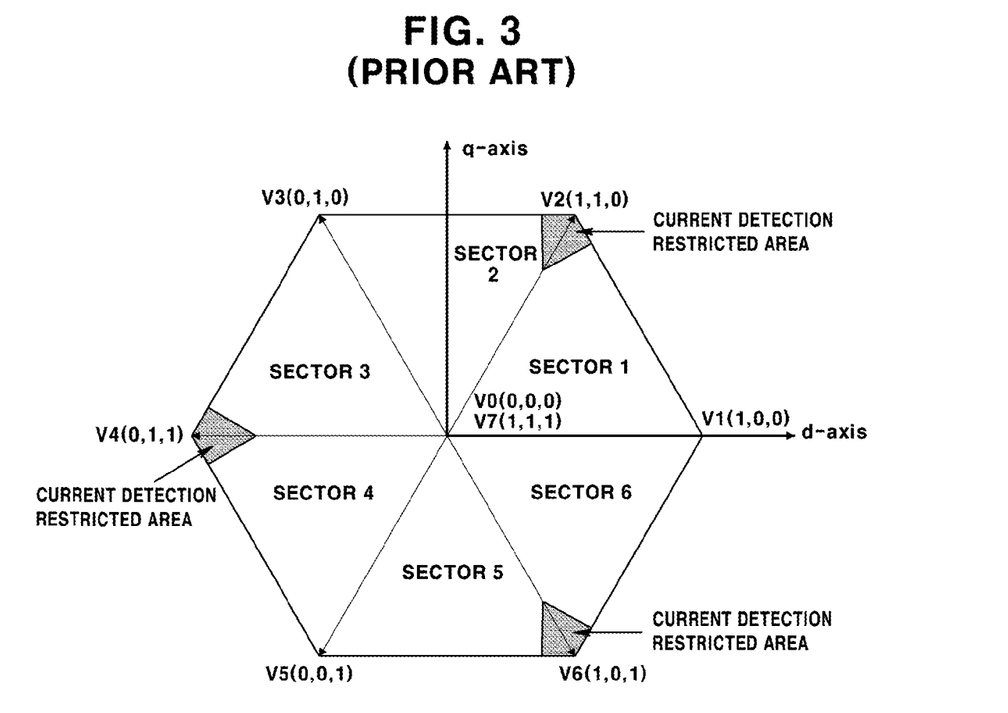
FIG. 3 is an exemplary view illustrating a current detection restricted area of a leg-shunt-type inverter.
Figure 4:
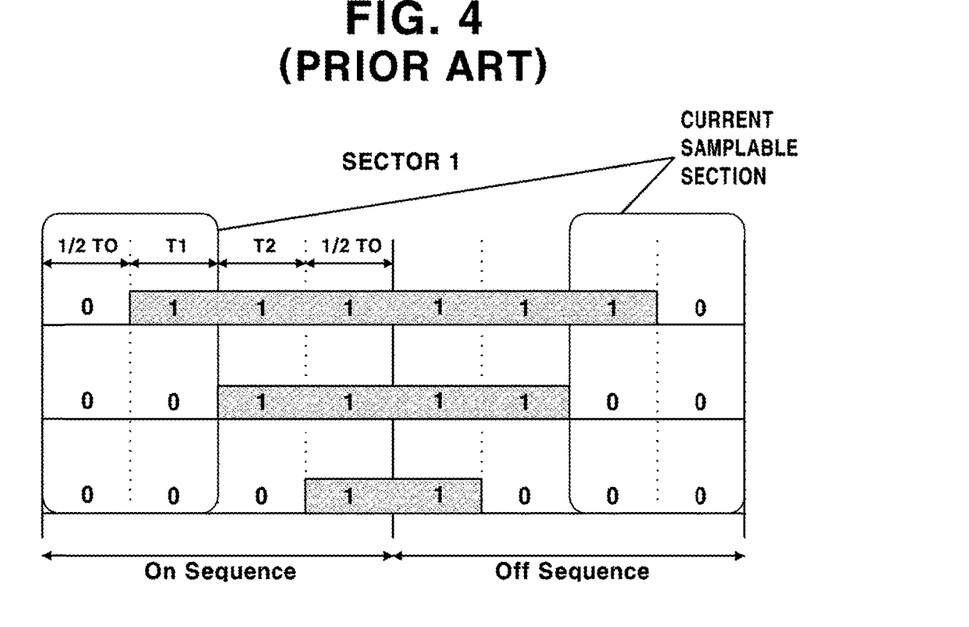
FIG. 4 is an exemplary view illustrating a phase current detection section in a leg-shunt-type inverter.

FIG. 3 is an exemplary view illustrating a current detection restricted area of a leg-shunt-type inverter. FIG. 4 is an exemplary view illustrating a phase current detection section in a leg-shunt-type inverter.

The space vector PWM (SVPWM) is formed of six non-zero vectors and two zero vectors. The PWM control unit transforms the 3-phase output current of the inverter into a low-voltage reference vector V* on a two-dimensional plane between d-axis and q-axis. The V* is formed of a combination of two adjacent non-zero vector and a zero vector.

As illustrated in FIG. 4, in Sector 1 (referring to FIG. 3), during the first half of the PWM cycle, switching vectors are in sequential order of a zero vector V0 (0, 0, 0), a non-zero vector 1 V1 (1, 0, 0), a non-zero vector 2 V2 (1, 1, 0), and a zero vector V7 (1, 1, 1), then during the last half of the PWM cycle, the switching vectors are applied in reverse order (it is referred to as 'symmetric SVPWM').

In the structure as illustrated in FIG. 2, current detection of each phase by the leg-shunt-type inverter is practicable when lower IGBTs of each phase are turned-on for the current to flow to the shunt resistors (23). In addition, current detection of the inverter 3 phases is practicable in the section where at least two of the lower IGBTs are turned-on in condition that 3 phases of the inverter are in parallel, as illustrated in FIG. 4.

When two IGBTs are turned-on so that current detection of 2 phases becomes practicable, the rest of one phase current may be detected indirectly through calculating the relation formula of ius+ivs+iws=0. The result may differ by sectors categorized in FIG. 3, as described in the following TABLE 1.

TABLE 1

| Sector | Iu | Iv | Iw |
|---|---|---|---|
| 1 | Iu = (Ivs + Iws) | Iv = −Ivs | Iw = −Iws |
| 2 | Iu = −Ius | Iv = (Ius + Iws) | Iw = −Iws |
| 3 | Iu = −Ius | Iv = (Ius + Iws) | Iw = −Iws |
| 4 | Iu = −Ius | Iv = −Ivs | Iw = (Ius + Ivs) |
| 5 | Iu = −Ius | Iv = −Ivs | Iw = (Ius + Ivs) |
| 6 | Iu = (Ivs + Iws) | Iv = −Ivs | Iw = −Iws |

For the purpose of controlling the vectors to escape from the current detection restricted area in such the leg-shunt-type inverter, there is a method for controlling a voltage reference vector to escape from the current detection restricted area by altering magnitude and angle of the voltage reference vector when the voltage reference vector enters the current detection restricted area. The method is according to the following EQUATION 1.

$$T_{samp\_min} = t_{dt} + t_{rs} + 2t_{sn} \qquad \text{EQUATION 1}$$

where tdt is an inverter dead-time; trs is a current detection circuit delay time; tsn is an AD converter sampling time; and tsamp_min is a minimum detection time of the leg-shunt resistor current detection.

However, the conventional technology described in the above is not considering a method to cope with a situation where the current detection is not performed precisely outside of the expected current detection unavailable area.

Figure 5:
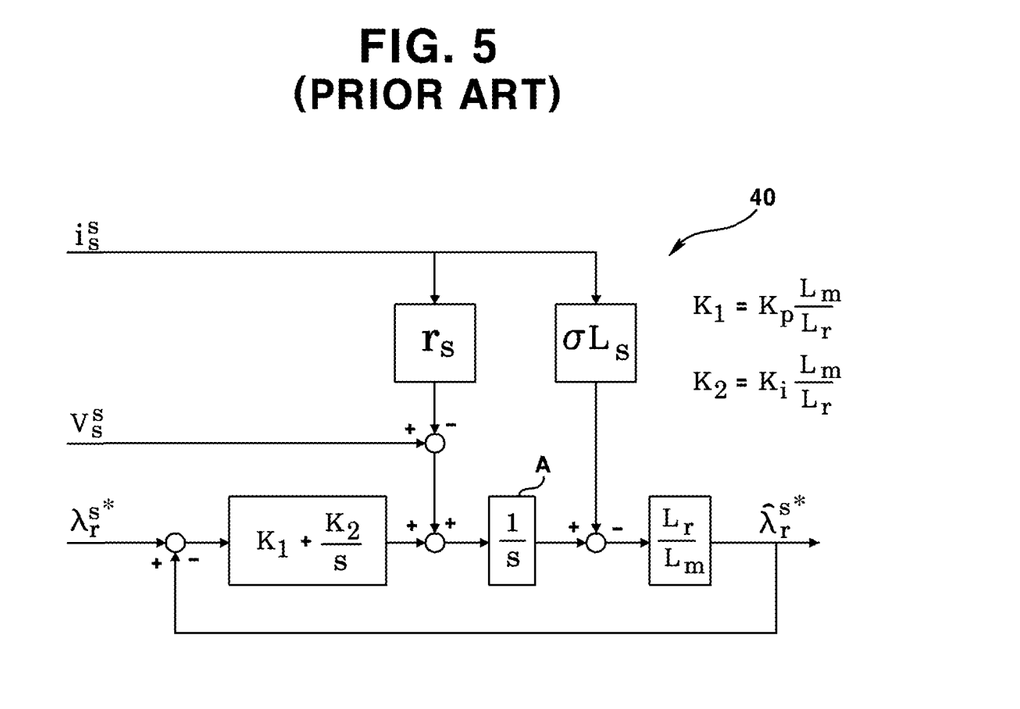
FIG. 5 is an exemplary view illustrating a rotor flux estimation unit.

Meanwhile, in the inverter which is vector-controlled without sensor, a rotor flux is estimated as illustrated in FIG. 5, and the rotating velocity of a rotor is estimated based on the rotor flux without a separate velocity detector such as an encoder. FIG. 5 is an exemplary view illustrating t rotor flux estimation unit.

As illustrated in FIG. 5, when the rotating velocity of the rotor is estimated by detecting the rotor flux, when the measured current is considerably different even instantaneously from the actual physical current, there occurs a possibility where a number of sensorless vector control modules including the rotor flux estimation unit are operating unstably.

$$w_{sl} = \frac{1}{T_r} \frac{i^e_{qs}}{i^e_{ds}} \qquad \text{EQUATION 2}$$

$$\theta_e = \int (w_r + w_{sl}) dt$$

$$T_r = L_r / R_r$$

The method for indirect-vector-controlling an induction motor without sensor is to calculate a synchronous angle θe to use in calculation of a reference voltage vector as described in EQUATION 2. To this end, the rotor velocity values of wr and wsl are required to be precisely evaluated.

The rotor velocity wr is estimated by the estimated rotor flux, and the slip velocity wsl is proportional to the proportion of q-axis current to d-axis current, as described in EQUATION 1.

In a leg-shunt-type inverter, it is experimentally ascertained that there is a very high probability to read current information incompletely around the (0 1 1), (1 0 1), (1 1 0) vector boundaries where the sectors are intersecting on the output voltage vector diagram illustrated in FIG. 3, even outside of the current detection unavailable area defined in EQUATION 1.

Figure 6:
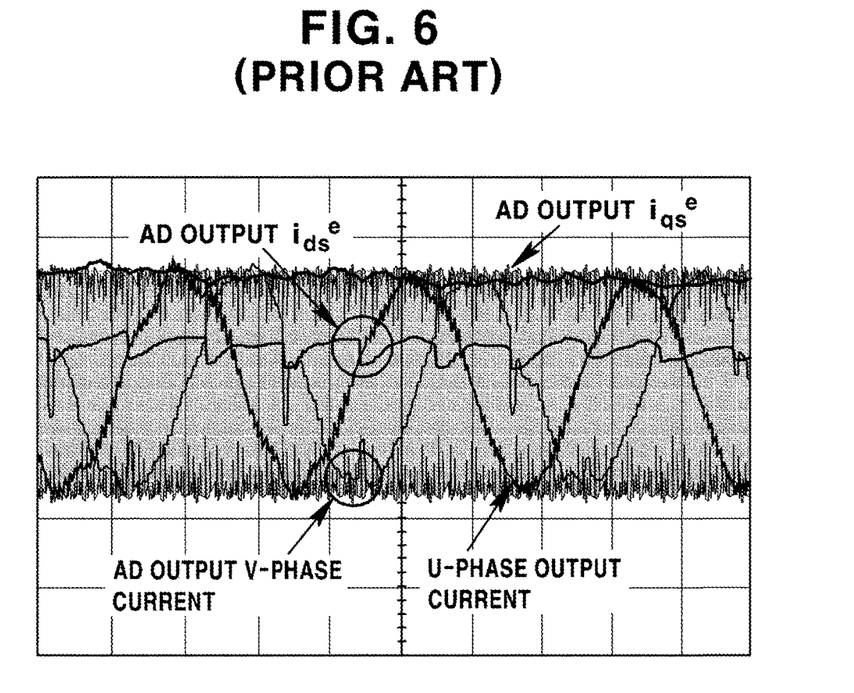
FIG. 6 is an experimental waveform illustrating observation of an instability phenomenon of inverter sensorless control when limit performance of a leg-shunt resistor current detection circuit is not complemented.
Figure 7:
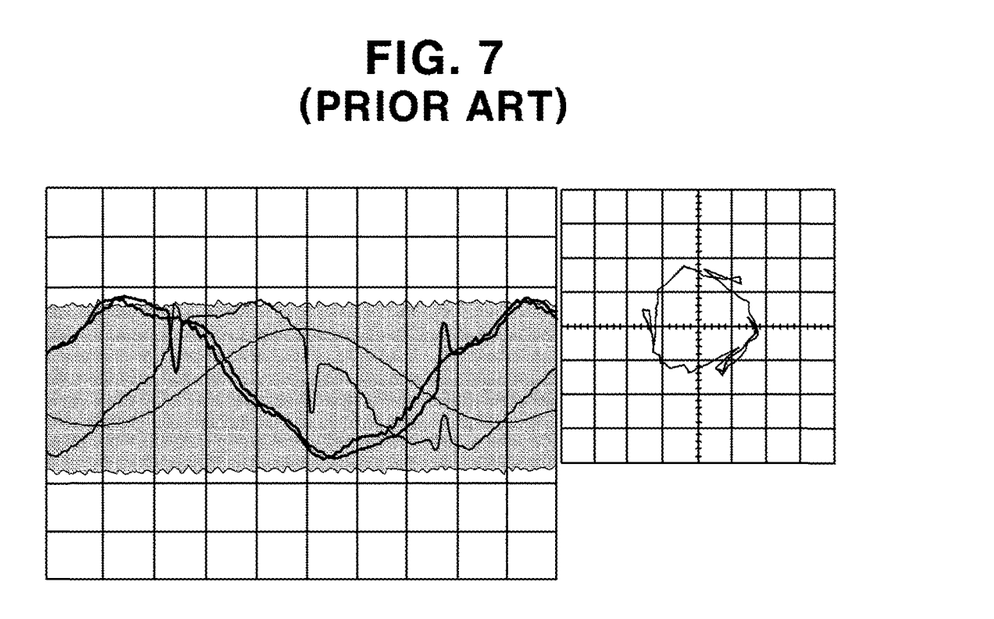
FIG. 7 is an experimental waveform illustrating a low-pass filtered current which is detected by a leg-shunt-type inverter.

FIG. 6 is an experimental waveform illustrating observation of an instability phenomenon of inverter sensorless control when limit performance of a leg-shunt resistor current detection circuit is not complemented. FIG. 7 is an experimental waveform illustrating a low-pass filtered current which is detected by a leg-shunt-type inverter.

Referring to FIG. 6, because a predetermined load is on operation, a pulsation should not occur at $i_{qs}^{e}$. In addition, referring to FIG. 7, the waveform on the left is a result of coordinate transformation of 3-phase current into 2-phase current, where the yellow waveform is d-axis stator current; the red waveform is q-axis stator current; and the green waveform is U-phase current measured by an oscilloscope for comparison. The waveform on the right is a result of phase plotting of stator current vectors on the left.

That is, it is experimentally ascertained that there is a probability to read current information incompletely, not only inside of the triangles posed around the vector vertices, but also in areas around the boundary lines of relevant vectors where zero vector time seems to be secured sufficiently.

Such a problem may be determined as not considerably affecting magnitude of the estimated flux, not because the current considerably different from the actual current detected by the leg-shunt is continuously detected, but because values multiplied by sampling time during a short period are integrated in the flux estimation unit integration when the current is detected in the amount of around one sample.

However, it is experimentally observed a phenomenon where magnitude and angle of the current vector ($i_{qs}^{e}$) instantaneously jump at the moment of observing an abnormality current value as illustrated in FIG. 6, when applying more than a certain load (around 100% load of rated load) to the motor controlled by the inverter and phase plotting on the d-q axis coordinate plane of stator current vector on the stationary reference frame. And in the next step, a phenomenon of returning in retrograde to values of the existing vectors is observed.

Furthermore, in this situation, vs−Rs·is, which is a difference between stator voltage and stator voltage drop across a stator resistance operating as an integration object in the stator flux estimation unit, has an instantaneously high peak value. Here, in order to perform this calculation, when variables are set in comparatively wide areas to increase calculative resolution in middle-low price micro-controller unit (MCU)s and digital signal processor (DSP)s which are only dealing with integer operations, a variable over-flow may occur and thus the variable is initialized to cause step variation of the estimated flux. After then, the flux estimation is not performed properly. This may cause problems such as inverter out-of-step phenomenon, etc.

In addition, referring to FIG. 6, it may be observed that the d-axis element of stator current on the synchronous reference frame is repeatedly showing step variations in spite of constant reference. This phenomenon may generate errors in calculation of slip velocity as described in the first equation of EQUATION 2, and may incur adverse effects such as estimation velocity error to sensorless control performance of indirect vector control type of the induction motor which is seriously affecting efficiency of synchronous angle calculation.

SUMMARY OF THE DISCLOSURE

The technical challenge which the present disclosure intends to achieve is, to provide an apparatus and a method for controlling an inverter, by correcting stator and rotor flux of an induction motor, by determining whether the current detected by leg-shunt resistor method is in a current detection unavailable area.

In one general aspect of the present disclosure, there may be provided apparatus for controlling an inverter, the apparatus comprising: a first determination unit configured to determine a 3-phase current by receiving a 2-phase current from a leg-shunt resistor arranged at an emitter terminal of a lower switching element in an inverter unit of the inverter; a detection unit configured to determine whether there is an abnormality in the 3-phase current; and a correction unit configured to correct the abnormality in the 3-phase current when the detection unit determines that there is generated the abnormality.

In some exemplary embodiments of the present disclosure, the apparatus may further comprise a conversion unit configured to convert the phase current from the first determination unit to a stator current at stationary reference frame.

In some exemplary embodiments of the present disclosure, the detection unit may include a reference generation unit configured to set a reference to detect whether there is generated the abnormality based on a first difference between a stator voltage and a voltage drop across a stator resistance; a boundary setting unit configured to generate a boundary for determination of the abnormality; and a second determination unit configured to determine the abnormality in the current when an absolute value of a second difference between the reference and the first difference is larger than the boundary.

In some exemplary embodiments of the present disclosure, the reference may be a low-pass filtered first difference between the stator voltage and the voltage drop across the stator resistance.

In some exemplary embodiments of the present disclosure, the boundary may be a value in which a third difference between a maximum value and a minimum value of the first difference is multiplied by a predetermined constant.

In some exemplary embodiments of the present disclosure, the correction unit may correct the abnormality in the stator current using the following equation:

$$\vec{i}_{s\_recon}^{s} = \frac{\vec{v}_{s}^{s} - LPF(\vec{v}_{s}^{s} - R_{s}\vec{i}_{s\_AD}^{s})}{R_{s}},$$

where $v_{s}^{s}$ is the stator voltage at stationary reference frame; $R_{s}$ the stator resistance; and $i_{s\_AD}^{s}$ is the stator current with the abnormality at stationary reference frame.

In some exemplary embodiments of the present disclosure, the apparatus may further comprise an estimation unit configured to re-estimate a rotor flux of a motor by receiving a corrected current from the correction unit.

In some exemplary embodiments of the present disclosure, the apparatus may further comprise a control unit configured to control the inverter unit by updating a stator d-axis and q-axis current control command on a synchronous reference frame based on the re-estimated rotor flux.

In another general aspect of the present disclosure, there may be provided a method for controlling an inverter, the method comprising: determining a 3-phase current outputted from the inverter, using a 2-phase current detected from a leg-shunt resistor; setting a reference to detect whether there is generated the abnormality based on a first difference between a stator voltage and a voltage drop across a stator resistance; setting a boundary for determination of the abnormality; determining that there is the abnormality in the current when an absolute value of a second difference between the reference and the first difference is larger than the boundary; and correcting the abnormality in the current when it is determined that there is generated the abnormality.

In some exemplary embodiments of the present disclosure, the method may further comprise re re-estimating a rotor flux of a motor by receiving a corrected current.

In some exemplary embodiments of the present disclosure, the method may further comprise controlling an inverter unit of the inverter by updating a stator d-axis and q-axis current control command on a synchronous reference frame based on the re-estimated rotor flux.

According to an exemplary embodiment of the present disclosure, the performance stability for inverter vector control may be acquired, by determining abnormality of phase currents and correcting the current of the relevant step and reflecting it to flux estimation.

In addition, according to an exemplary embodiment of the present disclosure, the probability of inverter step out may be decreased, by preventing overflow of variables of MCU/DSP by avoiding the phase current abnormality to be applied to the control command under the heavy load.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein. Rather, the described aspect is intended to embrace all such alterations, modifications, variations, and equivalents that fall within the scope and novel idea of the present disclosure.

Hereinafter, referring to enclosed figures, an exemplary embodiment of the present disclosure will be described in detail.

Figure 8:
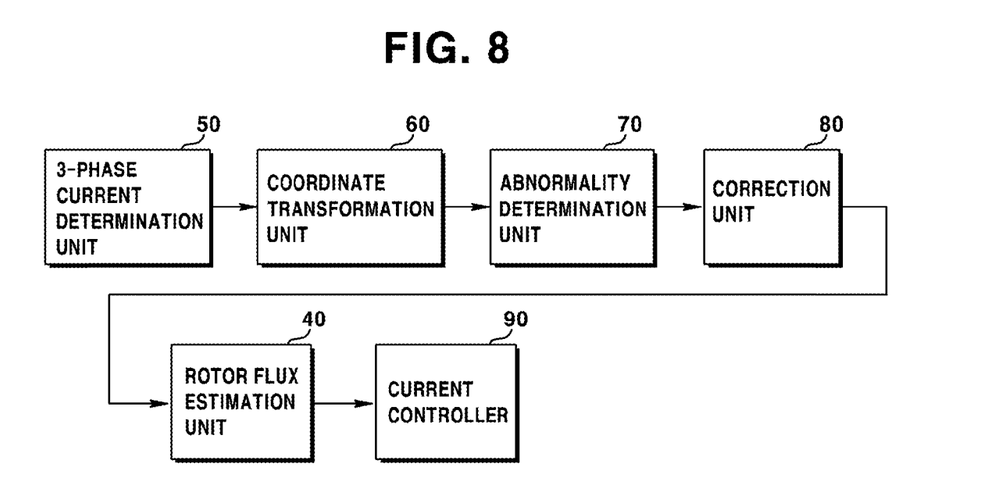
FIG. 8 is a block diagram illustrating an inverter control apparatus according to an exemplary embodiment of the present disclosure.

FIG. 8 is a block diagram illustrating an inverter control apparatus according to an exemplary embodiment of the present disclosure. The apparatus may be applied to a system as illustrated in FIG. 1. The apparatus vector-controls switching of the inverter unit (30), by receiving currents detected in the leg-shunt resistor (23) as illustrated in FIG. 2.

As illustrated in FIG. 8, the inverter control apparatus according to an exemplary embodiment of the present disclosure includes a 3-phase current determination unit (50), a coordinate transformation unit (60), an abnormality determination unit (70), and a correction unit (80). The output from the correction unit (80) is inputted to the rotor flux estimation unit (40), and the current control unit (90) controls the inverter (1) based on the flux estimated in the rotor flux estimation unit (40).

The 3-phase current determination unit (50) may determine a 3-phase current by receiving a 2-phase current detected in the leg-shunt resistor (23), in order to detect the current only when lower IGBTs of each phase are turned-on. Here, the relations are as described in TABLE 1 in the above. The 3-phase current detected in such steps may be stored in a storage unit which is not illustrated in the figure.

The coordinate transformation unit (60) may coordinate-transform the detected phase currents into stator stationary reference frame d and q-axis currents. This may be expressed in the following formula.

$$\vec{i}_{s\_AD}{}^{s} = (i_{ds\_AD}{}^{s}, i_{qs\_AD}{}^{s})^{T} \qquad \text{EQUATION 3}$$

Figure 9:
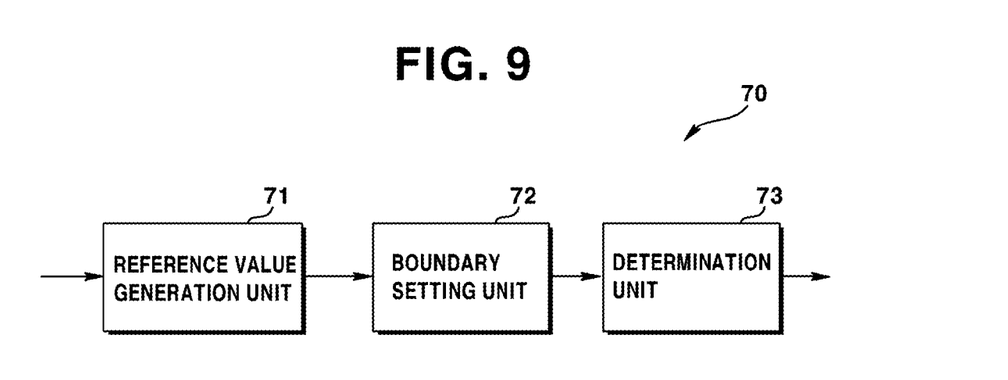
FIG. 9 is a detailed block diagram illustrating an abnormality determination unit illustrated in FIG. 8.

FIG. 9 is a detailed block diagram illustrating an abnormality determination unit illustrated in FIG. 8.

As illustrated in the figure, the abnormality detection unit (70) according to an exemplary embodiment of the present disclosure may include a reference value generation unit (71), a boundary setting unit (72), and a determination unit (73).

The reference value generation unit (71) may set a reference value, using a difference between a stator voltage and a voltage drop across a stator resistance (vs−Rs·is). At first, the reference value generation unit (71) defines a formula as described in the following in order to determine whether there is an abnormality in the detected current, using a difference between a stator voltage and a voltage drop across a stator resistance which is an input of the integrator (A) in the stator flux estimation unit illustrated in FIG. 5. Hereinafter, the subscripts 'd', 'q' represent the axis of coordinates, the subscript 's' means the stator, and the superscript 'e' represent the synchronous reference frame.

$$\vec{e}^s = (e_d^s, e_q^s)^T = (v_{ds}^s - R_s i_{qs\_AD}^s)^T \qquad \text{EQUATION 4}$$

The reference value generation unit (71) may low-pass filter the $\vec{e}^s$ defined in the above, to generate as a reference value for abnormality detection. This is defined as $LPF(\vec{e}^s)$.

The boundary setting unit (72) may set boundary radiuses for abnormality detection in respect to d,q-axis, respectively, as the following.

$$\epsilon_d = k \times \{\max(e_d^s) - \min(e_d^s)\}$$

$$\epsilon_q = k \times \{\max(e_q^s) - \min(e_q^s)\} \qquad \text{EQUATION 5}$$

where, k is a constant, and may be, for example, 0.2. Here, when determining the maximum (max) and the minimum (min) values, the abnormalities (outliers) should be excluded. Update may be performed for the range of recent 3 cycles of $LPF(\vec{e}^s)$ in sine-wave form.

The determination unit (73) determines as an abnormality when an absolute value of a difference between $\vec{e}^s$ and $LPF(\vec{e}^s)$ is larger than $\epsilon_d$ or $\epsilon_q$.

The correction unit (80) may correct the abnormality stator current using the following formula, when receiving the abnormality from the abnormality determination unit (70).

$$\vec{i}_{s\_recon}^s = \frac{\vec{v}_s^s - LPF(\vec{v}_s^s - R_s \vec{i}_{s\_AD}^s)}{R_s} \qquad \text{EQUATION 6}$$

The rotor flux estimation unit (40) formed as in FIG. 5, may re-estimate the rotor flux as in the following, by receiving such the corrected abnormality stator current.

$$\vec{\lambda}_s^s = \int (\vec{v}_s^s - R_s \vec{i}_{s\_recon}^s) dt \qquad \text{EQUATION 7}$$

$$\vec{\lambda}_r^s = \frac{L_r}{L_m}(\vec{\lambda}_s^s - \sigma L_s \vec{i}_{s\_recon}^s)$$

Afterwards, the current control unit (90) may control the inverter (1) by updating a stator d-axis and q-axis current control command on a synchronous reference frame, based on the re-estimated rotor flux.

Figure 10:
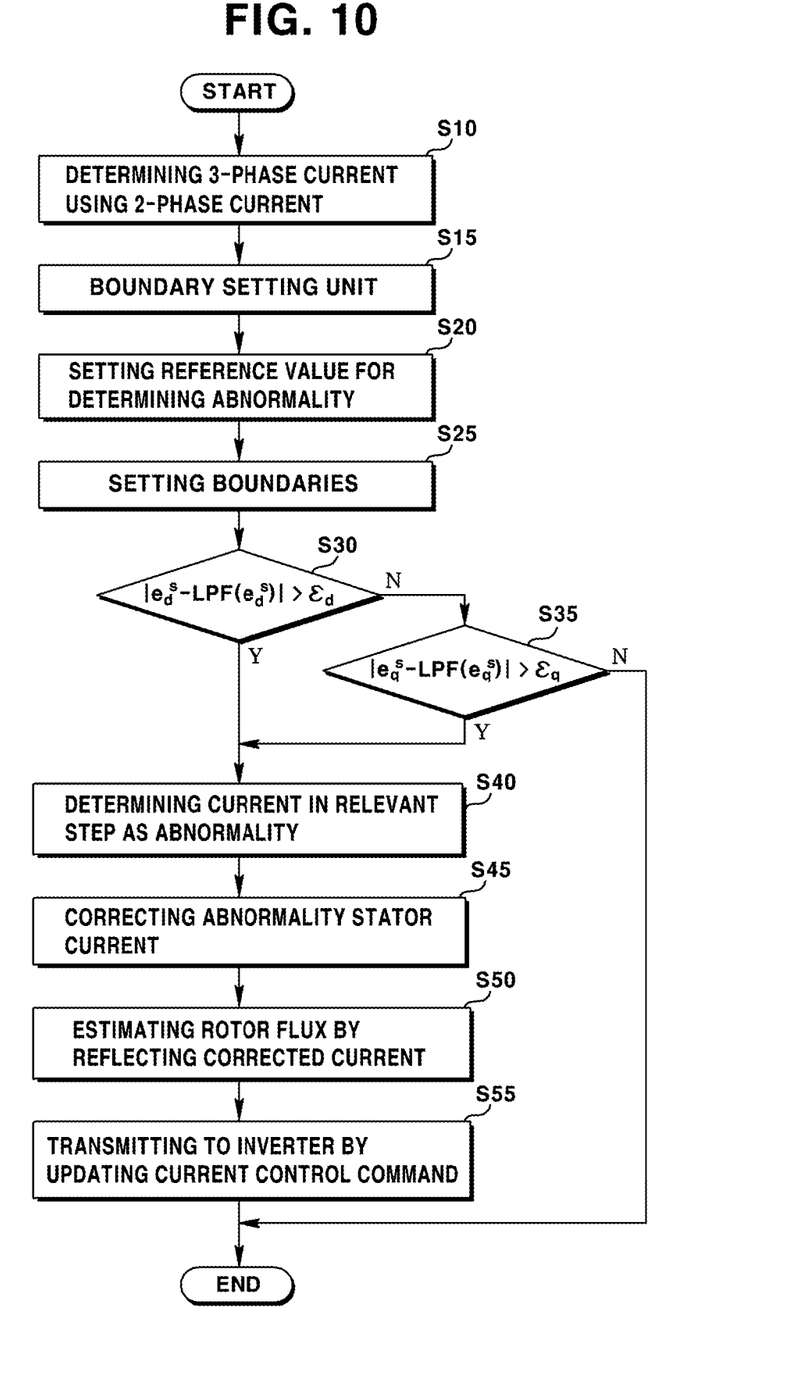
FIG. 10 is a flow chart illustrating an inverter control method according to an exemplary embodiment of the present disclosure.

FIG. 10 is a flow chart illustrating an inverter control method according to an exemplary embodiment of the present disclosure.

As illustrated in the figure, by the inverter control method according to an exemplary embodiment of the present disclosure, the 3-phase current determination unit (50) may determine a 3-phase current through the relations as in TABLE 1, by receiving a 2-phase current detected in the leg-shunt resistor (S10). Afterwards, the coordinate transformation unit (60) may coordinate-transform the detected phase currents into stator stationary reference frame d and q-axis currents as described in EQUATION 3.

Using such the transformed current, the reference value generation unit (71) in the abnormality determination unit (70) may low-pass filter the difference between a stator voltage and a voltage drop across a stator resistance (EQUATION 4) to generate a reference value $(LPF(\vec{e}^s))$(S20). The boundary setting unit (72) may set boundary radiuses for abnormality detection using EQUATION 5 (S25).

The determination unit (73) determines the current in the relevant step as an abnormality when an absolute value of a difference between the reference value and a difference between a stator voltage and voltage drop across a stator resistance is larger than the boundary (S30, S35, S40).

The correction unit (80), when the current in the relevant step is determined as an abnormality, may correct the abnormality stator current using EQUATION 6 (S45). Then, the rotor flux estimation unit (40) may re-estimate rotor flux using EQUATION 7 (S50), by receiving the corrected abnormality stator current.

The current control unit (90) may update a stator d-axis and q-axis current control command on a synchronous reference frame based on the re-estimated rotor flux, and then may transmit the updated stator d-axis and q-axis current control command to the inverter unit (30) in the inverter (1) (S55). Then the inverter unit (30) may perform switching by the relevant current control command.

Figure 11:
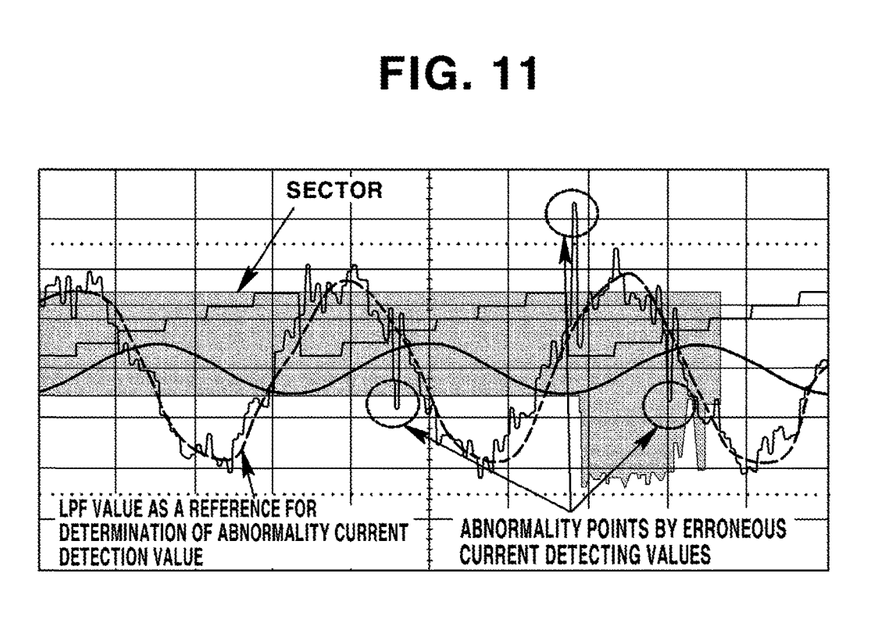
FIG. 11 is an exemplary view illustrating abnormality current detection according to an exemplary embodiment of the present disclosure.

FIG. 11 is an exemplary view illustrating abnormality current detection according to an exemplary embodiment of the present disclosure.

Referring to FIG. 11, the pink waveform is an input waveform of the integrator (A) in the rotor flux estimation unit (40), which is a difference between a stator voltage and a voltage drop across a stator resistance (vs−Rs·is). It becomes definitely distinctive by the moment when an abnormality current is inputted. According to an exemplary embodiment of the present disclosure, the abnormality current is detected based on these particular points.

According to an exemplary embodiment of the present disclosure, the performance stability for inverter vector control may be acquired, by determining abnormality of phase currents and correcting the current of the relevant step and reflecting it to flux estimation.

In addition, according to an exemplary embodiment of the present disclosure, the probability of inverter step out may be decreased, by preventing overflow of variables of MCU/DSP by avoiding the phase current abnormality to be applied to the control command under the heavy load.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments. Therefore, the technical scope of the rights for the present disclosure shall be decided by the claims.

What is claimed is:

1. An apparatus for controlling an inverter, the apparatus comprising:
   a first determination unit configured to determine a 3-phase current by receiving a 2-phase current from a leg-shunt resistor arranged at an emitter terminal of a lower switching element in an inverter unit of the inverter;
   a detection unit configured to determine whether there is a deviation in the 3-phase current; and
   a correction unit configured to correct the determined deviation, wherein the detection unit includes:
a reference generation unit configured to set a reference to detect the deviation based on a first difference between a stator voltage and a voltage drop across a stator resistance;
a boundary setting unit configured to generate a boundary for determining the deviation; and
a second determination unit configured to determine the deviation when an absolute value of a second difference between the reference and the first difference is larger than the boundary.

2. The apparatus of claim 1, further comprising:
a conversion unit configured to convert the 3-phase current from the first determination unit to a stator current at a stationary reference frame.

3. The apparatus of claim 1, wherein the reference includes a low-pass filtered first difference between the stator voltage and the voltage drop across the stator resistance.

4. The apparatus of claim 1, wherein the boundary is a value generated by multiplying a predetermined constant by a third difference between a maximum value and a minimum value of the first difference.

5. The apparatus of claim 2, wherein:
the correction unit corrects the deviation in the stator current using the following equation:

$$\vec{i}_{s\_recon}^{s} = \frac{\vec{v}_s^s - LPF(\vec{v}_s^s - R_s \vec{i}_{s\_AD}^s)}{R_s};$$

$v_s^{\,s}$ is the stator voltage at the stationary reference frame;
$R_s$ is the stator resistance; and
$i_{s\_AD}^{\,s}$ is the stator current with the deviation at the stationary reference frame.

6. The apparatus of claim 1, further comprising:
an estimation unit configured to re-estimate a rotor flux of a motor by receiving a corrected current from the correction unit.

7. The apparatus of claim 6, further comprising:
a control unit configured to control the inverter unit by updating a stator d-axis and q-axis current control command on a synchronous reference frame based on the re-estimated rotor flux.

8. A method for controlling an inverter, the method comprising:
determining a 3-phase current output from the inverter by receiving a 2-phase current from a leg-shunt resistor arranged at an emitter terminal of a lower switching element in an inverter unit of the inverter;
setting a reference to detect whether there is a deviation in the 3-phase current based on a first difference between a stator voltage and a voltage drop across a stator resistance;
setting a boundary for determining the deviation;
determining the deviation when an absolute value of a second difference between the reference and the first difference is larger than the boundary; and
correcting the determined deviation.

9. The method of claim 8, further comprising:
re-estimating a rotor flux of a motor by receiving a corrected current.

10. The method of claim 9, further comprising:
controlling an inverter unit of the inverter by updating a stator d-axis and q-axis current control command on a synchronous reference frame based on the re-estimated rotor flux.

11. The method of claim 8, further comprising:
converting the 3-phase current to a stator current at a stationary reference frame.

12. The methods of claim 11, further comprising correcting the deviation in the stator current using the following equation:

$$\vec{i}_{s\_recon}^{s} = \frac{\vec{v}_s^s - LPF(\vec{v}_s^s - R_s \vec{i}_{s\_AD}^s)}{R_s},$$

wherein:
$v_s^{\,s}$ is the stator voltage at the stationary reference frame;
$R_s$ is the stator resistance; and
$i_{s\_AD}^{\,s}$ is the stator current with the deviation at the stationary reference frame.

13. The method of claim 8, wherein the reference includes a low-pass filtered first difference between the stator voltage and the voltage drop across the stator resistance.

14. The method of claim 8, wherein the boundary is a value generated by multiplying a predetermined constant by a third difference between a maximum value and a minimum value of the first difference.

* * * * *